United States Patent

Weich et al.

[11] Patent Number: 4,588,057
[45] Date of Patent: May 13, 1986

[54] LOADED HYDRAULICALLY ACTUATABLE PISTON AND CONTROLS SYSTEM THEREFOR

[75] Inventors: Debra L. Weich, Fox Point, Wis.; William J. Pratt, Spring Grove, Ill.

[73] Assignee: Kobe Steel Ltd., Kobe, Japan

[21] Appl. No.: 488,370

[22] Filed: Apr. 25, 1983

[51] Int. Cl.$^4$ .............................................. B60K 41/20
[52] U.S. Cl. .................... 192/3 R; 74/411.5; 188/72.4
[58] Field of Search .............. 192/18 A, 17 A, 4 A, 192/4 R, 1, 2, 3 R, 3 S; 188/72.3, 72.4, 72.5, 370; 92/52, 53, 63; 74/411.5, 760, 761, 781 R

[56] References Cited

U.S. PATENT DOCUMENTS

| | | | |
|---|---|---|---|
| 2,053,055 | 9/1936 | Wadd | 192/4 R |
| 3,497,036 | 2/1970 | Seip | 188/72.4 |
| 3,892,300 | 7/1975 | Hapeman et al. | 192/2 |
| 4,071,940 | 2/1978 | Hazelton | 192/18 A |
| 4,428,462 | 1/1984 | Warwick | 188/72.4 |

*Primary Examiner*—George H. Krizmanich
*Attorney, Agent, or Firm*—James E. Nilles

[57] ABSTRACT

The horizontally rotatable upper section of a mobile crane is swingable in opposite directions by a speed reducer which is driven by a selectively operable reversible variable speed hydraulic motor. A fail-safe spring-loaded hydraulic brake located on the speed reducer operates, when needed, to slow or stop or prevent rotation of the upper section. A hydraulic control system which supplies pressurized hydraulic fluid to operate the motor and the brake includes a pedal-operated master brake cylinder for selectively applying the brake when the motor is in operation. The brake comprises a cylinder housing, an outer brake piston axially movable through a hole in the housing, and an inner brake piston axially movable in a bore in the outer brake piston. Each piston has an extended position and a retracted position. These pistons are movable alternately to extended (brake-apply) position to force a movable brake plate into frictional engagement with a brake disc which is mounted on and rotatable with a motor-driven input shaft of the speed reducer. A main biasing spring is provided to bias the outer brake piston into extended brake-apply position before the hydraulic motor is turned on and any time a selector valve is opened to dump pressurized fluid from a reservoir. An auxiliary spring is provided to bias the inner brake position into retracted position. The hydraulic control system is operable to start the motor and to supply fluid to shift the outer brake piston to retracted brake-release position. The pedal-operated master brake cylinder is then operable, if needed, to supply fluid to shift the inner brake piston to extended brake-apply position even though the outer brake piston is still retracted.

11 Claims, 12 Drawing Figures

LOADED HYDRAULICALLY ACTUATABLE PISTON AND CONTROLS SYSTEM THEREFOR

BACKGROUND OF THE INVENTION

1. Field of Use

This invention relates generally to a fail-safe spring-loaded hydraulic brake and to a control system therefor. In particular, it relates to a brake and control system employed to slow, arrest or prevent rotation of a rotatable component in a machine.

2. Description of the Prior Art

Some machines, such as mobile cranes, employ a speed reducer having rotatable input and output shafts to transmit motive power between the drive shaft of a motor and a rotatable component on the machine, such as the horizontally rotatable or swingable upper section of the crane. The speed reducer provides necessary speed reduction and increased mechanical advantages. In some instances it is necessary to immediately arrest the motion of the movable component as soon as the motor is stopped (either intentionally or because of a system failure) or to slow or momemtarily stop the motion while the motor is still running. It is also necessary in some cases to prevent unintentional motion of the component whenever the motor is stopped, either during or at the end of operation of the machine. Accordingly, a suitable brake is provided for such purposes and such brake can act directly on the motor shaft or on the shafts of the speed reducer or on the movable component.

U.S. Pat. No. 4,263,991 issued Apr. 28, 1981, to Morgan et al. discloses a hydraulically operated brake which is connected between the output shaft of a hydraulic motor and the input shaft of a speed reducer. The brake comprises a stationary housing, and a motor-driven rotor shaft journaled in the housing. A number of rotor discs are carried on the shaft for rotation therewith, but they are adapted for axial sliding motion on the shaft, as by a spline arrangement. A number of stator discs are interleaved with the rotor discs and are carried on torque pins mounted in the housing for sliding motion in the direction of the rotor shaft axis, but are secured against rotational movement with the rotor shaft and rotor discs. Biasing springs urge the stator discs into braking engagement with the rotor discs. To relieve this braking action and permit free shaft rotation, a primary piston, having an annular skirt surrounding the rotor discs, engages one stator disc to apply a force urging that stator disc in a direction opposite to the force applied by the biasing means so as to release the braking action. A secondary device is included for opposing the primary piston action so as to permit the biasing means to urge the stator discs into braking engagement with the rotor discs. This secondary device can be independently energized, as by fluid pressure or mechanical means, as by a service brake. This secondary device includes a piston carried in an annular cylinder chamber and the piston is located to apply a force against the stator disc in opposition to the force applied by the primary piston.

SUMMARY OF THE PRESENT INVENTION

In accordance with the present invention, there is provided an improved fail-safe spring-loaded hydraulic brake and improved control system therefor for slowing, arresting and preventing rotation of a rotatable component in a machine. The brake is especially well-suited for use, for example, with a motordriven speed reducer employed in a machine such as a mobile crane to rotate or swing the upper section of the crane in opposite directions about a vertical axis, wherein the speed reducer is driven by a selectively operable variable speed reversible hydraulic motor, and wherein a hydraulic control system is provided to supply pressurized hydraulic fluid to operate the motor and the brake, which system includes a pedal-actuated or manually actuated master brake cylinder for selectively applying the brake. However, the brake could have other applications.

In the preferred embodiment disclosed herein, the speed reducer includes a motor-driven rotatable input shaft on which a brake disc is mounted and the brake disc is rotatable with but axially slidable on the input shaft. A non-rotatable axially movable brake plate mounted adjacent the brake disc is axially movable by application of the brake into frictional engagement with the brake disc to slow, arrest or prevent rotation of the brake disc, the speed reducer input and output shafts and the upper section of the crane.

Generally considered, the brake in accordance with the invention comprises a hollow cylinder housing, an outer brake piston slidably mounted in the housing and an inner brake piston slidably mounted in an axial bore in the outer brake piston. Each piston has an extended position and a retracted position. Main biasing means, such as a first spring in the cylinder housing, is provided to shift the outer brake piston in one direction to an extended brake-apply position wherein it forces the movable brake plate into engagement with the brake disc. Means are provided on the housing to enable adjustment of the force exerted by the main biasing means. Auxiliary biasing means, such as a second spring in a space between the two pistons, is provided to shift the inner brake piston in a direction opposite to said one direction to a retracted position. A brake-release chamber in the housing on one side of the outer brake piston is supplied with pressurized hydraulic fluid from the hydraulic control system when the motor is actuated to shift the outer brake piston to brake-release position. A brake-apply chamber in the housing on one side of the inner brake piston is supplied with pressurized hydraulic fluid from the master brake cylinder in the hydraulic control system when the master brake cylinder is actuated (i.e., applied) to shift the inner brake piston to brake-apply position while the outer brake piston remains in brake-release position.

The hydraulic control system in accordance with the invention for the hydraulic motor and the brake generally comprises a source of pressurized hydraulic fluid, a selectively operable swing control valve for directing fluid flow to energize the motor and release the brake, a selectively operable selector valve to reapply the brake when the motor is stopped, and the aforementioned master brake cylinder.

The brake and control system therefor in accordance with the present invention offers several advantages over the prior art. For example, the means to effect hydraulic application and release of the brake, as well as the spring-apply means to effect spring application, are conveniently and economically embodied in a common housing, yet each means operates independently of the other. The spring-apply means which effect spring application of the brake can be easily adjusted to provide the necessary amount of application force. The spring-apply means enable the brake to function as a "parking" brake usable when the machine is out of service or to function as a "fail-safe" brake if a malfunction occurs during machine operation. The hydraulic-apply release means enable the brake to function as a dynamic brake or as a holding brake. The brake does not require pressure regulator valves or accumulators, as each hydraulic system for each piston functions independently of the other. All of the hydraulic-apply pressure is used for braking and not to override other hydraulically release pressures. All functions of the improved brake are performed with a multiple function piston assembly in a single housing. The brake can be adapted for use in multiple disc brakes, as well as single disc brakes as shown.

Other objects and advantages will hereinafter appear.

DESCRIPTION OF THE PREFERRED EMBODIMENTS

Figure 1:
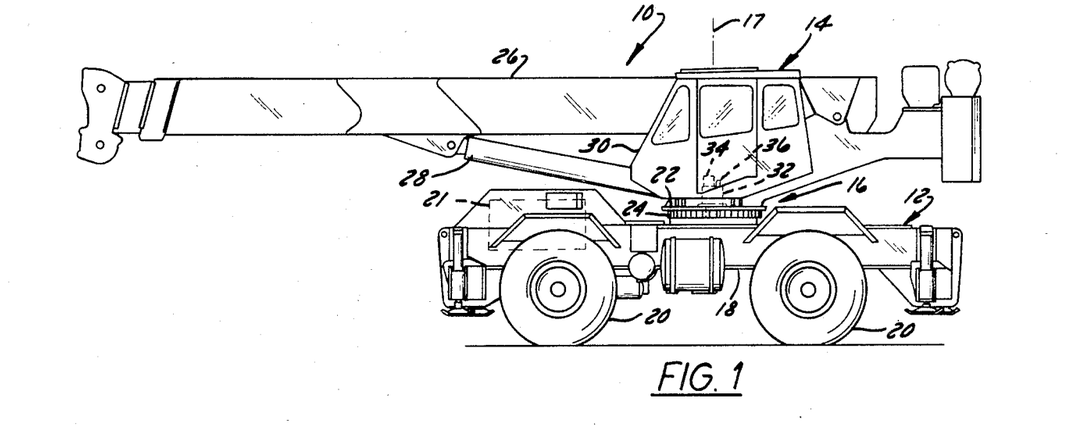
FIG. 1 is a side elevation view of a mobile crane employing apparatus including a speed reducer, a hydraulic motor, a hydraulic brake and a hydraulic control system therefor in accordance with the present invention.

Referring to FIG. 1, the numeral 10 designates a machine, such as a mobile crane, embodying a brake and control means therefore in accordance with the invention. Crane 10 comprises a lower section 12 and an upper section 14 rotatably mounted thereon by means of a slewing ring assembly 16 which enables the upper section 14 to be swung in opposite directions to any degree about a vertical axis 17. Lower section 12 of crane 10 comprises a chassis 18 having pairs of drivable and steerable ground-engaging wheels 20 mounted thereon. Lower section 12 carries a prime mover, such as an internal combustion engine 21, for providing propulsion power for the wheels 20, as well as operating power for hydraulic pumps and motors used to effect operation of certain movable vehicle components. Upper section 14 of crane 10 comprises a support frame 22 which is rotatably mounted on chassis 18 (as by bearings not shown) above a circular toothed slewing ring 24 which is stationarily mounted on chassis 18. Support frame 22 carries a telescoping boom 26 which can be raised or lowered by means of a hydraulically operated extendible/retractable boom hoist cylinder 28. Supporting frame 22 also carries an operator's cab 30 in which are located controls which are necessary to drive and operate the mobile crane 10. Such controls are not shown in FIG. 1, but FIG. 2 does show certain of such controls, hereinafter described, which are part of the hydraulic control system for the means which effects rotation (swinging) and braking of the upper section 14 of crane 10 relative to the lower section 12 about axis 17.

As FIGS. 1 through 5 show, the means to effect swinging and braking of upper section 14 generally comprise a speed reducer 32 which is rigidly secured as by bolts 33 to supporting frame 22 of upper section 14, a hydraulic motor 34 mounted on and operable to drive the speed reducer, a brake 36 mounted on and operable to brake the speed reducer and the aforementioned hydraulic control system (FIG. 3) for operating motor 34 and brake 36.

Motor 34 comprises a stationary housing 35 which is rigidly secured to speed reducer 32 by bolts 38 and also comprises a rotatable drive shaft 37. Motor 34 is a conventional commercially available variable speed reversible hydraulic motor.

Figure 5:
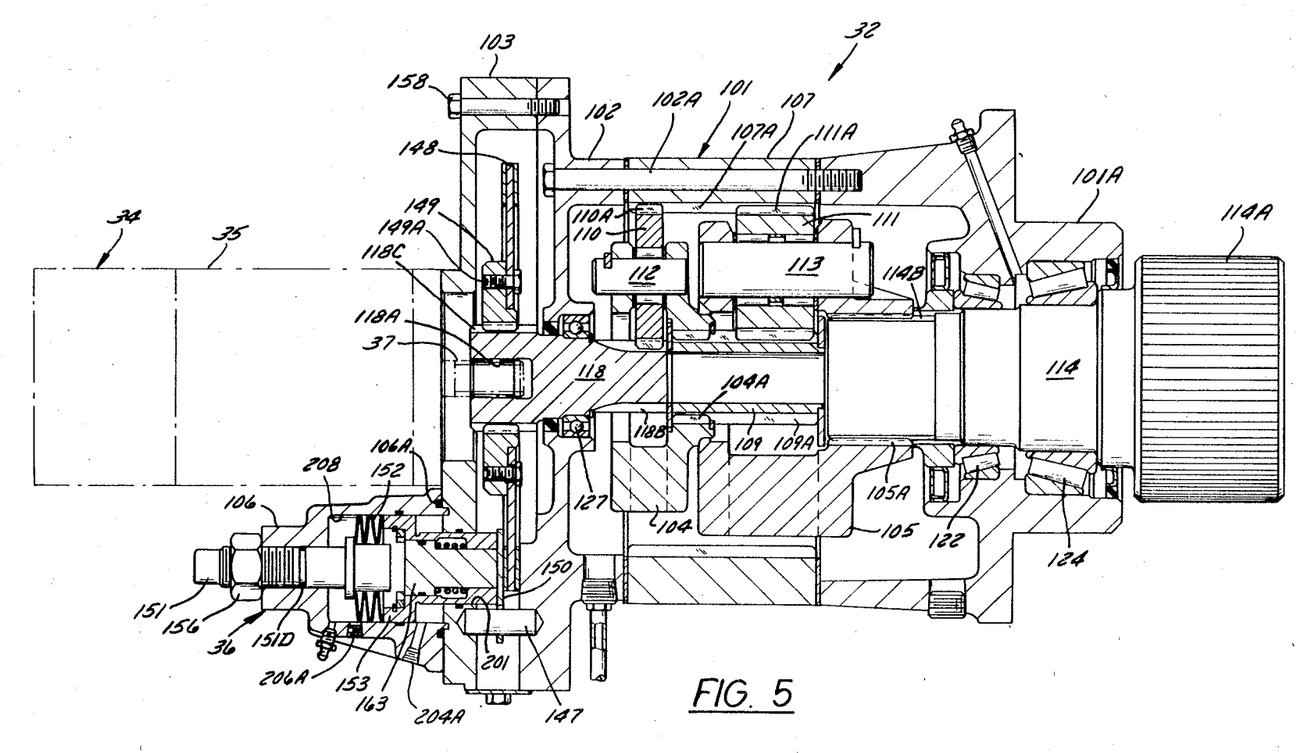
FIG. 5 is an enlarged cross-section view taken on line 5—5 of FIG. 4 and showing interior details of the speed reducer and the hydraulic brake.

Speed reducer 32, which functions as a speed reduction and power transmission means between swing motor 34 and slewing ring 24, comprises a stationary housing 101 which is rigidly secured to support frame 22 of upper section 14 of crane 10 by bolts 33. Housing 101 comprises a bearing support 101A, a stationary ring gear portion 107 and a bearing support 102, all of which are secured together in axial end-to-end arrangement by mounting bolts such as 102A. Housing 101 also comprises a cover 103 which is secured to bearing support 102 by cap screws such as 158. Speed reducer 32 also comprises a power input pinion shaft 118 at one end and a power output shaft 114 at its other end to which a drive gear 114A is rigidly affixed for rotation therewith. Input shaft 118 is provided at its outermost end with a splined recess 118A in which motor shaft 37 is slidably received in driving engagement (FIG. 5). Drive gear 114A is in constant mesh and driving engagement with the teeth of the stationary slewing ring 24. Thus, when gear 114A is rotatably driven, it causes supporting frame 22 of upper section 14 of crane 10 to rotate about axis 17 relative to the lower section 12.

As FIG. 5 shows, bearing support 102 of housing 101 supports a bearing 127 on which pinion shaft 118 is rotatably mounted. Bearing support 101A of housing 101 supports bearings 122 and 124 on which output shaft 114 is rotatably mounted. Ring gear portion 107 of housing 101 includes an inwardly facing surface which defines ring gear teeth 107A. Pinion shaft 118 is provided at its innermost portion with gear teeth 118B. Output shaft 114 is provided at one end with a splined portion 114B. An input carrier member 104 has teeth 104A which are engaged with the teeth of output pinion gear 109. An output carrier member 105 has teeth 105A which are engaged with the splined portion 114B of output shaft 114. Input carrier member 104 supports a plurality of input planet shafts 112 which are radially arranged therearound and each shaft 112 rotatably supports a primary planet gear 110. The teeth 110A of each planet gear 110 mesh with the teeth 107A of ring gear 107 and also engage the splined portion 118B of pinion shaft 118. Output carrier member 105 supports a plurality of output planet shafts 113 which are radially arranged therearound and each shaft 113 rotatably supports an output planet gear 111. The teeth 111A of each output plane gear 111 mesh with the teeth 107A of ring gear 107 and also engage the teeth 109A of output pinion gear 109.

In operation, when pinion shaft 118 is rotatably driven by shaft 37 of motor 34, power is transmitted from shaft 118, through the primary gears 110, the input carrier 104, the output pinion gear 109, and the output planet gears 111, the output carrier 105, to output shaft 114 and its gear 114A.

As FIGS. 2 and 5 through 8 show, pinion shaft 118 is provided as its outermost end and beneath cover plate 103 with a splined portion 118C on which a brake hub 149 is non-rotatably but axially slidably mounted. A flat circular brake disc 148 is rigidly affixed to hub 149 by cap screws 149A. Thus, brake disc 148 is rotatable with pinion shaft 118, as when shaft 118 is being driven by motor 34, or when motor 34 is de-energized but the inertial rotation of upper section 14 of crane 10 causes rotation of output shaft 114 and consequent rotation of input shaft 118 back through speed reducer 32.

Figure 2:
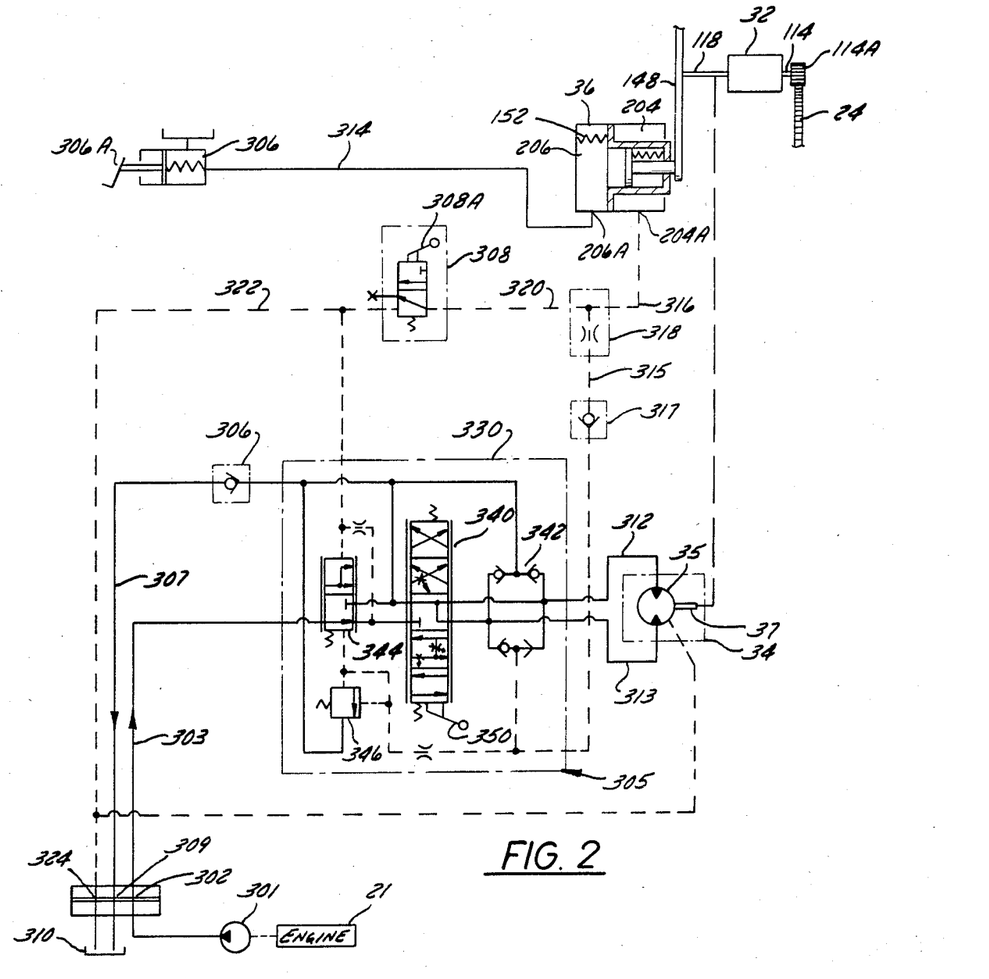
FIG. 2 is a circuit diagram of the hydraulic control system for the hydraulic motor and the hydraulic brake in the apparatus of FIG. 1.
Figures 5A, 5B, 6, 7, 8:
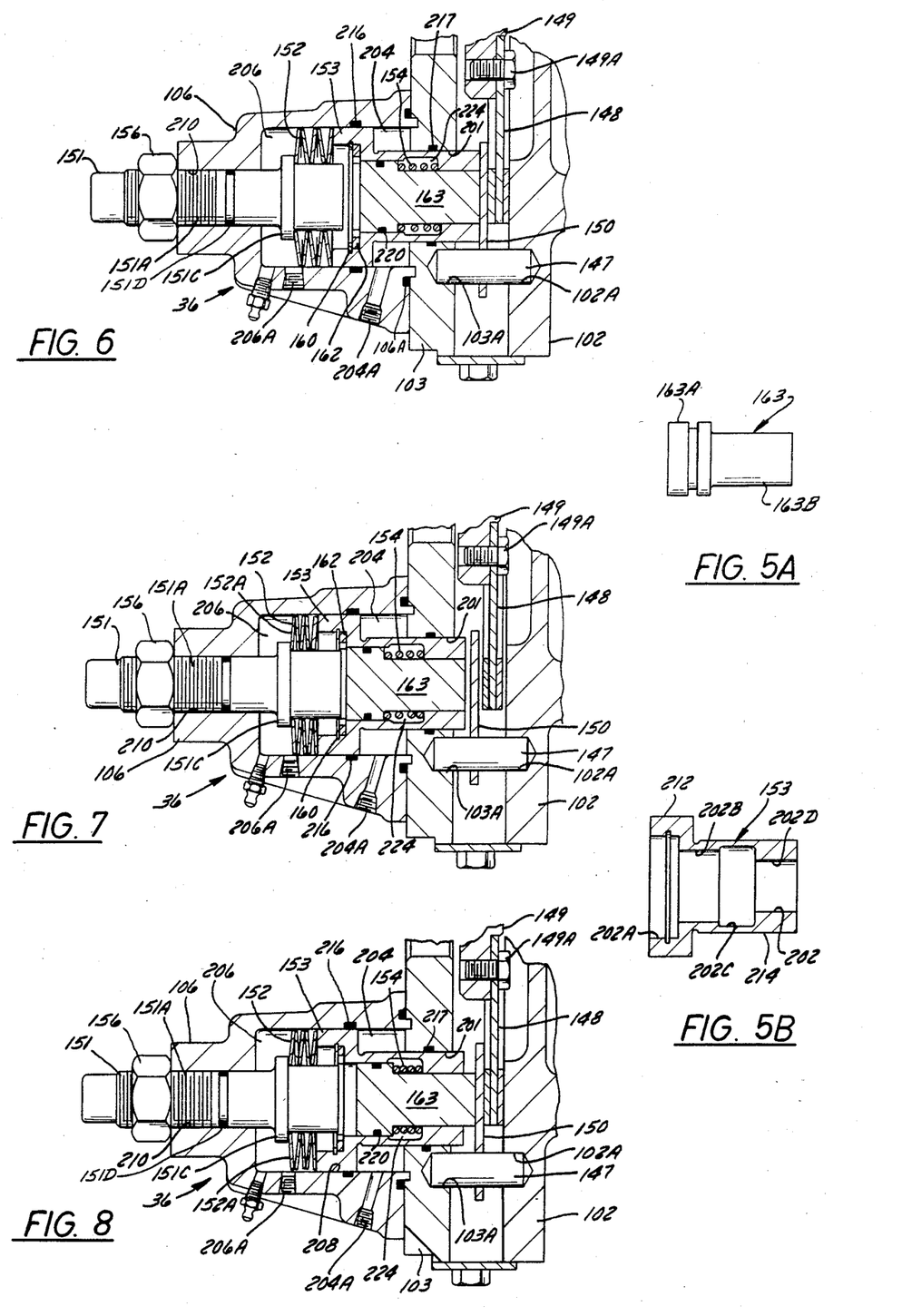
FIG. 5A is a side elevation view of an inner brake piston shown in FIG. 5.
FIG. 5B is a cross-section view of an outer brake piston shown in FIG. 5.
FIG. 6 is an enlarged cross-section view of the hydraulic swing brake showing it in the same operating condition as in FIG. 5, i.e, spring-applied and not pressurized.
FIG. 7 is a view similar to FIG. 6 but showing the hydraulic swing brake in hydraulic brake-released condition.
FIG. 8 is a view similar to FIG. 6 and FIG. 7 but showing the hydraulic swing brake in hydraulic brake-applied condition.

As FIGS. 5 through 8 show, brake 36 generally comprises a cylinder housing 106, an outer brake piston 153 axially movable in the cylinder housing and through a hole 201 at the end of the housing, and an inner brake piston 163 axially movable in a bore 202 in the outer brake piston. Each piston 153, 163 has an extended position and a retracted position. These pistons 153, 163 are movable alternately to an extended brake-apply position to force a movable brake plate 150 into frictional engagement with brake disc 148 which is mounted on and rotatably with a motor-driven input pinion shaft 118 of the speed reducer 32. A main biasing spring 152 is provided to bias the outer brake piston 153 into extended brake-apply position when the hydraulic motor is off. An auxiliary biasing spring 154 is provided to bias the inner brake piston 163 into retracted position (FIG. 6). The control system shown in FIG. 2 is operable to supply fluid to a chamber 204 in the brake cylinder housing 106 to move the outer brake piston 153 to retracted brake-release position (FIG. 7). A pedal-operated master brake cylinder 306 in the control system is then operable, if needed, to supply fluid to a chamber 206 in the brake cylinder housing 106 to move the inner brake piston 163 to extended brake-apply position (FIG. 8).

Figure 3:
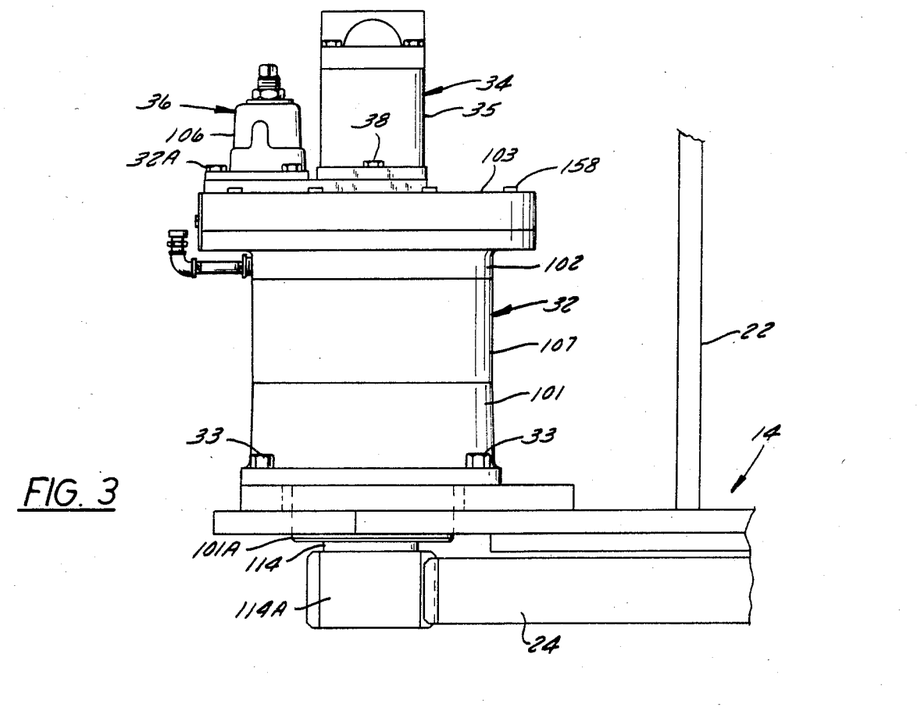
FIG. 3 is an enlarged side elevation view of the speed reducer on which the hydraulic motor for driving the speed reducer and the hydraulic brake in accordance with the invention are mounted, as shown in FIG. 1.
Figure 4:
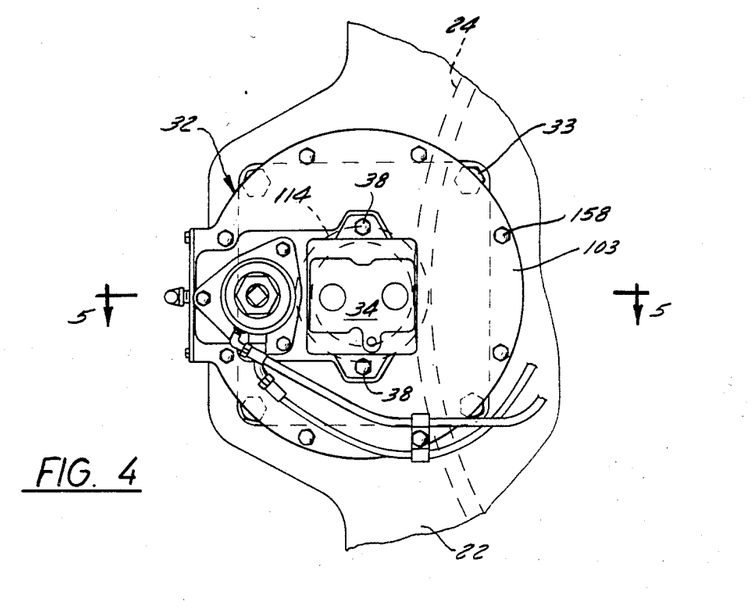
FIG. 4 is an end elevation view of the components shown in FIG. 1.

More specifically, cylinder housing 106 is rigidly secured to cover 103 on speed reducer 32 by bolts 32A, as FIGS. 3 and 4 show, and overlies hole 201 in cover 103. Housing 106 is provided with a large smooth cylinder bore 208 at one end which communicates with the hole 201 in cover 103. Housing 106 is also provided with a small threaded cylinder bore 210 at its other end which communicates with bore 208. An O-ring 106A is disposed at the interface between housing 106 and cover 103.

As FIG. 5B shows, the outer brake piston 153 comprises a first cylindrical portion 212 which is axially slidable in bore 208 and further comprises an integral second cylindrical portion 214 of reduced diameter which is axially slidable in hole 201 in cover 103. Outer brake piston 153 is provided with internal axial bore 202 extending therethrough, which bore includes portions of differing diameters, namely portions 202A, 202B, 202C and 202D. Fluid-tight O-ring seals 216 and 217 are provided in housing 106 around the cylinder portion 212 and 214 of outer brake piston 153, respectively.

As FIG. 5A shows, the inner brake piston 163 is slidably mounted in axial bore 202 in outer brake piston 153 and comprises a first cylindrical portion 163A which is axially slidable in bore portion 202B and further comprises an integral second cylindrical portion 163B which is axially slidable in bore portion 202D. A fluid-tight O-ring seal 220 is provided around inner brake piston 163 and engages bore portion 202B. A retaining plate 162 and an associated retaining ring 160 prevent inner brake piston 163 from moving (leftward in FIG. 6) out of the inner end of bore 202 in outer brake piston 153.

The bore portion 202C of outer brake piston 153 and the outer cylindrical portion 163B of inner brake piston 163 cooperate to define a space 224 in which auxiliary biasing spring 154 is mounted and this spring takes the form of a helical compression spring surrounding inner brake piston 163. An adjusting screw 151 having a threaded portion 151A threadably engaged in threaded cylindrical bore 210 in housing 106 extends into bore 208 in housing 106. Screw 151 includes a flange 151C and the main biasing spring 152, which comprises a plurality of (five) resilient Belleville (TM) washers or springs such as 152A, is disposed between flange 151C and the inner end of outer brake piston 153. A jam nut 156 is mounted on threaded portion 151A of screw 151 to maintain the latter in some predetermined desired position. Spring 152 serves as a first biasing means between cylinder housing 106 and outer brake piston 153 for shifting the latter in one direction (rightward in FIG. 6) to extended brake-applying position (FIG. 6) wherein the portion 214 of outer brake piston 153 protrudes a predetermined distance out of hole 201 in cover 103. Spring 154 serves as a second biasing means between outer brake piston 153 and inner brake piston 163 for shifting the latter in a direction (leftward in FIGS. 6 and 7) opposite to said one direction to retracted position. Screw 151 is provided with an O-ring seal 151D.

Large bore 208 in cylinder housing 106 includes the first chamber 204 defined between cylinder housing 106, cover 103 and outer brake piston 153 for receiving hydraulic fluid through a port 204A in housing 106 which effects movement of outer brake piston 153 from extending brake-apply position (FIG. 6) to retracted brake-release position (FIGS. 7 and 8). Large bore 208 in cylinder housing 106 also includes the second chamber 206 defined between cylinder housing 106 and the inner end of inner brake piston 163 for receiving hydraulic fluid through a port 206A which effects movement of inner brake piston 163 from retracted position (FIGS. 6 and 7) to extended brake-apply position (FIG. 8).

Brake 36 includes a projection or pin 147 located on the exterior of cylinder housing 106 and physically mounted in holes 103A and 102A in cover 103 and bearing support 102. Pin 147 extends in the same direction as and parallel to the paths of movement of pistons 153 and 163. The brake plate 150 is mounted for non-rotatable shiftable axial movement of pin 147 and extends into said paths for engagement by pistons 153, 163 as the latter move to their respective extended positions. Brake plate 150, when pressed with appropriate force into engagement with brake disc 148 which is fabricated of material which has a high co-efficient of friction, slows, stops or prevents rotation of the brake disc.

The hydraulic control system for hydraulic motor 34 and brake 36 is shown in FIG. 2 and is seen to comprise a source of pressurized hydraulic fluid, such as a hydraulic pump 301 which is driven by engine 21 and supplies fluid through a hydraulic swivel connector 302 and a fluid supply line 303 to a swing control valve 305. The hydraulic control system also includes a pedal-operated master brake cylinder 306 for selectively applying the brake 36 and a manually operated selector valve 308 for dumping fluid from the brake 36, as hereinafter explained. Cylinder 306 is connected to supply pressurized fluid to brake 36 through a fluid supply line 314. Cylinder 306 and its operating pedal 306A and selector valve 308 and its operating lever 308A are located in cab 30. A fluid return line 307, including a check valve 306, returns fluid from control valve 305 through a hydraulic swivel connector 309 to a fluid reservoir 310. Pump 301, engine 21 and reservoir 310 are mounted on crane chassis 18 and the swivel connectors 302 and 309 are mounted between chassis 18 and rotatable upper section 14 of crane 10. Control valve 305 operates to control fluid flow to hydraulic motor 34 through fluid lines 312 and 313. Control valve 305 also operates to control fluid flow to the first or brake release chamber 204 in brake 36 through the fluid lines 315 and 316 which contain a check valve 317 and a T-orifice 318 for regulating fluid flow.

Brake 36 is connected to return fluid through line 316, T-orifice 318, a line 320, selector valve 308, a drain line 322, and a swivel connector 324 (also mounted between chassis 18 and upper section 14) to reservoir 310.

As FIG. 2 shows, control valve 305 includes within a common housing 330 several valve sections or valve components, namely: a shiftable control valve spool 340, a set of three check valves 342, a shiftable diverter spool 344, and a shiftable pressure relief valve spool 346. Control valve spool 340 is shown in FIG. 2 biased to a neutral/off position but is movable therefrom by a manual operating lever 350 (understood to be located in cab 30) to low-speed or high-speed left or right swing positions to effect corresponding rotation of motor 34, speed reducer 32 and upper section 14 of crane 10. When fluid line 312 or 313 is pressurized by manual operation of valve spool 340, the set of check valves 342 enable pressurization of fluid line 315. If selector valve 308 is in the closed position shown in FIG. 2, then line 316 is pressurized from line 315 and this results in hydraulic release of brake 36 (FIG. 7) from its spring-applied condition (FIG. 6). When motor 34 is in operation and brake 36 is hydraulically released, slowing or stopping of rotation of upper crane section 14 can be effected by applying force to brake pedal 306A to supply fluid from master brake cylinder 306 to brake 36 to effect hydraulic application of the brake 36 (FIG. 8). When valve spool 340 is manually operated to return it to the neutral/off position shown in FIG. 2, motor 34 stops but brake 36 remains hydraulically released (FIG. 7) because fluid remains trapped in chamber 204 therein. Brake 36 can be returned from this hydraulically released condition (FIG. 7) by actuating operating lever 308A to open selector valve 308 and allow fluid to drain from brake valve chamber 204, through line 316, through T-orifice 318, through line 320, through open selector valve 308, through drain line 322 and connector 324 to reservoir 310.

As will be understood, the main biasing springs force the outer brake piston into extended brake apply position before the hydraulic motor is turned on and any time selector valve 308 is opened to dump pressurized fluid from reservoir 204. Also, the main springs will apply the brake if any one of parts 308, 320, 316, 318, 315, 317, 216 and 217 fail to seal the hydraulic fluid in cavity 204. This would comprise the fail-safe function of the brake.

Figure 9:
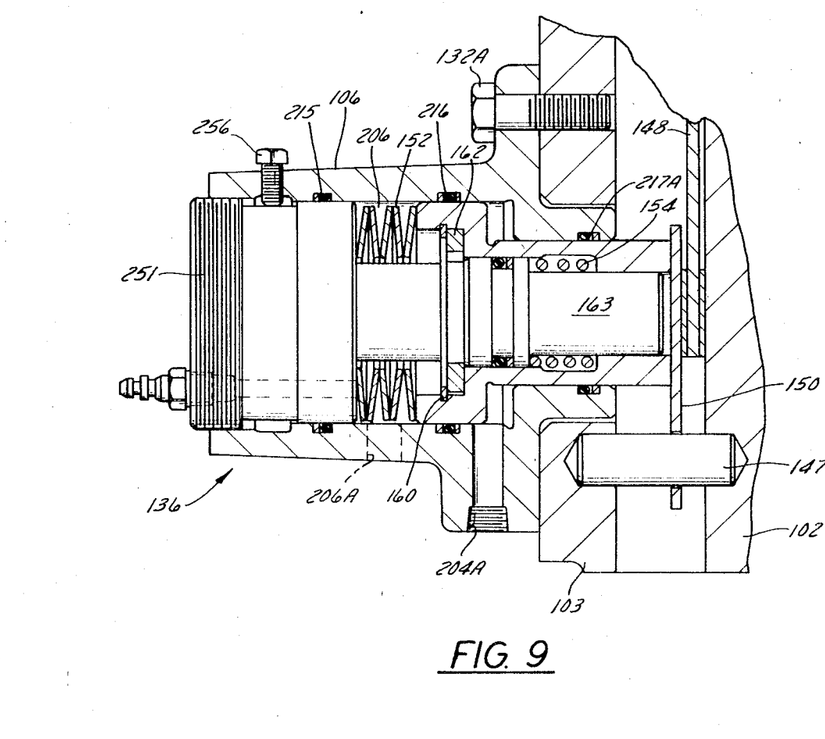
FIG. 9 is a cross-section view similar to FIG. 6 but showing another embodiment of a brake in accordance with the invention.
Figure 10:
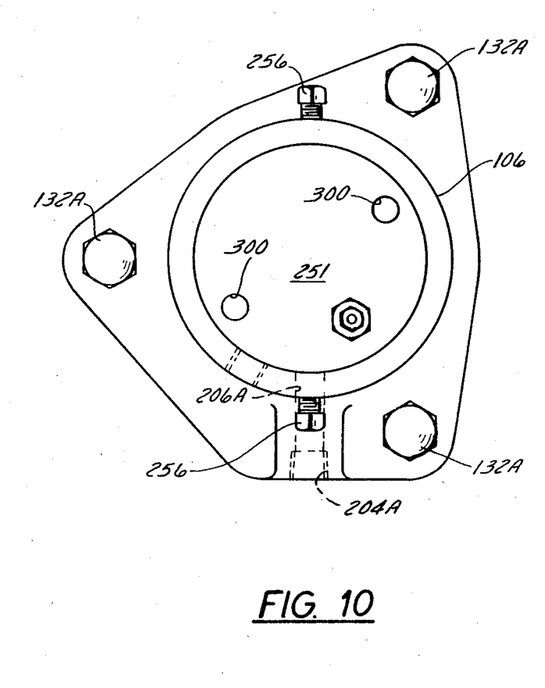
FIG. 10 is an end elevation view of the brake of FIG. 9.

FIGS. 9 and 10 show another embodiment of a brake, designated 136, which is generally similar to the brake 36 hereinbefore described, except as herinafter explained. In brakes 36 and 136, similar components have been designated by the same reference numerals. The brake 136 is a unitary module which is removably attachable to the cover 103 of the reducer 32 by means such as bolts 132A and all seals between cover 103 and brake 136 have been eliminated. Furthermore, brake 136 is provided with an adjusting plug 251 instead of the adjusting screw 151 used in brake 36 and employs two set screws such as 256 to lock plug 251 in position, instead of the jam nut 156 of brake 36. Plug 251 employs tool-receiving depressions 300 by which it is rotated. Brake 136 is provided with O-ring seals 215, 216 and 217A.

I claim:
1. A hydraulic brake comprising:
a cylinder housing having a first bore therein which is open at one end;
an outer brake piston slidably movable in said first bore and protrudible through said open end, said outer brake piston having a second axial bore therethrough;
an inner brake piston slidably movable in said second axial bore;
each of said pistons having a retracted position and an extended position;
first biasing means between said cylinder housing and said outer brake piston for shifting the latter in one direction to extended brake-apply position wherein said outer brake piston protrudes a predetermined distance out of said first bore;
second biasing means between said outer brake piston and said inner brake piston for shifting the latter in a direction opposite to said one direction to retracted position;
a brake plate mounted for movement relative to said cylinder housing and extending into the paths of movements of said pistons for engagement by said pistons as the latter move to respective extended positions;
a first chamber in said cylinder housing defined between said cylinder housing and said outer brake piston for receiving hydraulic fluid which effects movement of said outer brake piston from extended brake-apply position to retracted brake-release position against the bias of said first biasing means; and
a second chamber in said cylinder housing defined between said cylinder housing and said inner brake piston for receiving hydraulic fluid which effects movement of said inner brake piston from retracted brake-release position to extended brake-apply position.

2. A hydraulic brake according to claim 1 including a projection on the exterior of said cylinder housing extending in the same direction as the paths of movement of said pistons, and wherein said brake plate is mounted for shiftable axial movement on said projection and extends into said paths for engagement by said pistons as the latter move to respective extended positions.

3. A hydraulic brake according to claims 1 or 2 including an adjustably positionable member mounted on said cylinder housing and extending into said first axial bore in said cylinder housing, and wherein said first biasing means are disposed between said member and said outer brake piston.

4. A hydraulic brake according to claim 3 including a space defined between said outer brake piston and said inner brake piston within said second axial bore, and wherein said second biasing means is located within said space.

5. In a machine:
   a rotatable component;
   a motor operable to rotate said component;
   a brake member rotatable with said component;
   a hydraulic brake operable on said brake member to slow, arrest and prevent rotation of said component and comprising:
   a movable brake plate releasably engageable with said brake member,
   a shiftably movable outer brake piston for moving said brake plate,
   first biasing means to bias said outer brake piston in one direction into brake-applied position relative to said brake member,
   an inner brake piston shiftably movable relative to said outer brake piston for moving said brake plate,
   second biasing means to bias said inner brake piston in a direction opposite to said one direction,
   a first chamber in said hydraulic brake for receiving hydraulic fluid which effects movement of said outer brake piston from brake-applied position to brake-release position against the bias of said first biasing means, and
   a second chamber in said hydraulic brake for receiving hydraulic fluid which effects movement of said inner brake piston from brake release position to brake-applied position;
   and control means for operating said motor and said brake and comprising:
   a source of hydraulic fluid;
   first means operable to energize and de-energize said motor and, when said motor is energized, to supply pressurized hydraulic fluid to said first chamber of said brake to shift said outer brake piston in a direction opposite to said one direction and into brake-release position;
   second means operable to supply pressurized hydraulic fluid to said second chamber of said brake to shift said inner brake piston in one direction into a brake-applied position while said outer brake piston is in brake-release position;
   and third means operable to drain pressurized hydraulic fluid from said brake, when said motor is de-energized and when said inner brake piston is in brake-release position, to enable said first biasing means to bias said outer brake piston into brake-applied position.

6. A machine according to claim 5 wherein said first means comprises a multi-position selector valve; wherein said second means comprises a hydraulic master brake cylinder;
   and wherein said third means comprises a multi-position selector valve.

7. A machine according to claim 6 wherein said motor is a hydraulic motor.

8. A machine according to claim 5 wherein said brake plate is located between both of said pistons and said brake member and is shiftable by said pistons into frictional engagement with said brake member.

9. In combination:
   a speed reducer comprising a housing and a rotatable shaft extending from an end of said housing;
   a brake disc mounted on and rotatable with said shaft;
   a cover member connected to said housing and defining a space within which said brake disc is rotatable and having a hole therethrough;
   and a hydraulic brake mounted on said cover member;
   said brake comprising:
   a cylinder housing connected to said cover member having a first bore therein which is open at one end in registry with said hole in said cover member;
   an outer brake piston slidably movable in said first bore and protrudible through said hole in said cover member, said outer brake piston having a second axial bore therethrough;
   an inner brake piston slidably movable in said second axial bore;
   each of said pistons having a retracted position and an extended position;
   first biasing means between said cylinder housing and said outer brake piston for shifting the latter in one direction to extended brake-apply position wherein said outer brake piston protrudes a predetermined distance out of said hole in said cover member;
   second biasing means between said outer brake piston and said inner brake piston for shifting the latter in a direction opposite to said one direction to retracted position;
   a first chamber in said cylinder housing defined between said cylinder housing, said cover member and said outer brake piston for receiving hydraulic fluid which effects movement of said outer brake piston from extended brake-apply position to retracted brake-release position;
   a second chamber in said cylinder housing defined between said cylinder housing, said outer brake piston and said inner brake piston for receiving hydraulic fluid which effects movement of said inner brake piston from retracted position to extended brake-apply position;
   a pin between said cover member and said speed reducer housing and extending in the same direction as the paths of movement of said pistons, and a brake plate mounted for shiftable axial movement on said pin and extending into said paths for engagement by said pistons as the latter move to respective extended positions.

10. A hydraulic brake according to claim 9 including an adjustably positionable member mounted on said cylinder housing, and wherein said first biasing means are disposed between said member and said outer brake piston.

11. A hydraulic brake according to claim 10 including a space defined between said outer brake piston and said inner brake piston within said second axial bore, and wherein said second biasing means is located within said space.

* * * * *